(12) United States Patent
Deurr (10) Patent No.: US 9,573,500 B2
(45) Date of Patent: Feb. 21, 2017

(54) ILLUMINATED SEAT STANCHION

(71) Applicant: Premier Marine, Inc., Wyoming, MN (US)

(72) Inventor: John Deurr, Stacy, MN (US)

(73) Assignee: Premier Marine, Inc., Wyoming, MN (US)

( * ) Notice: Subject to any disclaimer, the term of this patent is extended or adjusted under 35 U.S.C. 154(b) by 89 days.

(21) Appl. No.: 14/713,059

(22) Filed: May 15, 2015

(65) Prior Publication Data

US 2016/0332548 A1 Nov. 17, 2016

(51) Int. Cl.
| | |
|---|---|
| *B60N 2/48* | (2006.01) |
| *B60Q 3/02* | (2006.01) |
| *B63B 29/04* | (2006.01) |
| *B63B 45/00* | (2006.01) |
| *B63B 45/06* | (2006.01) |
| *F21W 101/08* | (2006.01) |
| *F21W 101/04* | (2006.01) |

(52) U.S. Cl.
CPC .......... *B60N 2/4876* (2013.01); *B60Q 3/0223* (2013.01); *B63B 29/04* (2013.01); *B63B 45/00* (2013.01); *B63B 45/06* (2013.01); *B63B 2029/043* (2013.01); *F21W 2101/04* (2013.01); *F21W 2101/08* (2013.01)

(58) Field of Classification Search
CPC .......... B63B 45/00; B63B 45/06; B63B 29/04; B63B 2029/043; B60N 2/4876; B60Q 3/0223; F21V 33/0012; F21W 2101/04; F21W 2101/08; F21W 2131/301
USPC ....................................................... 297/217.6
See application file for complete search history.

(56) References Cited

U.S. PATENT DOCUMENTS

| 726,801 | A | | 4/1903 | Maxwell | |
|---|---|---|---|---|---|
| 1,002,694 | A | * | 9/1911 | Hoffman | A47B 85/04 |
| | | | | | 297/120 |
| 1,704,415 | A | * | 3/1929 | Wenegrat | A47C 7/725 |
| | | | | | 297/217.6 |
| 2,257,496 | A | * | 9/1941 | Gaugler | A47C 7/725 |
| | | | | | 297/217.6 |
| D234,809 | S | | 4/1975 | Delin | |
| D234,971 | S | | 4/1975 | Delin | |
| D290,410 | S | | 6/1987 | Haggard | |

(Continued)

FOREIGN PATENT DOCUMENTS

FR 2863973 A1 * 6/2005 ........... B60Q 3/0223

OTHER PUBLICATIONS

Couly, Alain Jean Charles, Jun. 24, 2005, Patent Translate Description FR2863973, pp. 1-4.*

*Primary Examiner* — Alan Cariaso
(74) *Attorney, Agent, or Firm* — Winthrop & Weinstine, P.A.

(57) ABSTRACT

A headrest associated with a seating position on a vehicle may be provided and the seating position may have a seat portion and a back portion. The headrest may include a rest portion configured for laterally and/or vertically supporting the head of a user seated in the seating position. The headrest may also include a support portion including a riser with a translucent material and the support portion may be configured for spaced apart and lateral support of the rest portion relative to the back portion of the seating position. The support portion may include a light source arranged to illuminate the support portion by directing light through the translucent material.

20 Claims, 7 Drawing Sheets

(56) References Cited

U.S. PATENT DOCUMENTS

| | | | |
|---|---|---|---|
| 4,681,366 A * | 7/1987 | Lobanoff | B60N 2/4876 |
| | | | 248/475.1 |
| D318,136 S | 7/1991 | Kira | |
| D338,631 S | 8/1993 | Braverman | |
| 6,394,551 B1 * | 5/2002 | Beukema | B60N 2/4855 |
| | | | 297/217.3 |
| 6,460,926 B1 * | 10/2002 | Neale | B60N 2/48 |
| | | | 297/216.12 |
| D468,842 S | 1/2003 | May | |
| D574,539 S | 8/2008 | Sanoner | |
| D639,988 S | 6/2011 | Chen | |
| D660,492 S | 5/2012 | Williams et al. | |
| D661,832 S | 6/2012 | Williams et al. | |
| D697,246 S | 1/2014 | Martzall | |
| D698,065 S | 1/2014 | Macura | |
| D745,204 S | 12/2015 | Skira | |
| 2012/0287610 A1 | 11/2012 | Krogman | |

* cited by examiner

ILLUMINATED SEAT STANCHION

FIELD OF THE INVENTION

The present disclosure relates to stanchions such as post, poles, supports, balusters, bollards and other elongate supporting members. In particular, the present disclosure relates to stanchions for portions of seats. Still more particularly, the disclosure relates to illuminated or lighted stanchions for supporting and/or positioning headrest portions of seats.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Headrest portions of seats are often supported relative to seatback portions of seats on one or more stanchions such as posts, poles, or other supports. In some cases, particularly in motor vehicles, such stanchions are fixed to the headrest in rigid fashion extending from the bottom of the headrest. The seat on which the headrest is supported may include a sleeve for receiving the stanchion and a clamp, stop, catch, or other mechanism may be provided to control how much of the stanchion is positioned in the sleeve. As such, the headrest stanchion may be adjusted inwardly and outwardly from the sleeve and secured in a selected position to support the headrest above the seat back to properly support and/or arrest rearward motion of a head of a person seated in the seat.

In light of the structural nature of the stanchions and the physicality of their use, headrest stanchions are commonly constructed of steel, aluminum, or other substantially rigid metal material. This material selection can lead to limitations relating to alternative uses and features of the headrest stanchions.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In one or more embodiments, a headrest is provided that is associated with a seating position on a vehicle. The seating position may include a seat portion and a back portion. The headrest may include a rest portion configured for laterally and/or vertically supporting the head of a user seated in the seating position. The headrest may also include a support portion comprising a riser comprising a translucent material and configured for spaced apart and lateral support of the rest portion relative to the back portion of the seating position. The support portion may also include a light source arranged to illuminate the support portion by directing light through the translucent material.

In another embodiment, a watercraft such as a boat may be provided. The watercraft may include a headrest associated with a seating position on a the boat. The seating position may include a seat portion and a back portion. The headrest may include a rest portion configured for laterally and/or vertically supporting the head of a user seated in the seating position. The headrest may also include a support portion comprising a riser comprising a translucent material and configured for spaced apart and lateral support of the rest portion relative to the back portion of the seating position. The support portion may also include a light source arranged to illuminate the support portion by directing light through the translucent material.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present application, in some embodiments, relates to illumination or lighting for a watercraft, such as a pontoon boat or other boat such as a runabout, ski boat, fishing boat, fish-n-ski, deck boat, sail boat, yacht or water craft. In particular, the present application relates to illuminated, lighted, or bulb-like seat elements or stanchions. Still more particularly, the present application, in some embodiments relates to illuminated or bulb-like seat stanchions for supporting a headrest or backrest relative to a seatback or seat, respectively. In some embodiments, the seat stanchion functions to structurally support the headrest of a seat relative to seat back while also being illuminated or bulb-like.

The present application is, thus, advantageous by establishing a relatively inconspicuous location on a watercraft that can provide lighting and/or ambiance to the watercraft and the watercraft experience. That is, it is to be appreciated that the open air nature of most watercrafts causes dissipation of light away from the surface of the watercraft in a relatively drastic manner. As such, lighting on a watercraft that can be seen and that can also provide useful lighting for other aspects of the watercraft can be difficult to provide. The present application allows for additional lighting to be provided to the watercraft and the watercraft experience without interrupting or otherwise disturbing the expected features of a watercraft.

Figure 1:
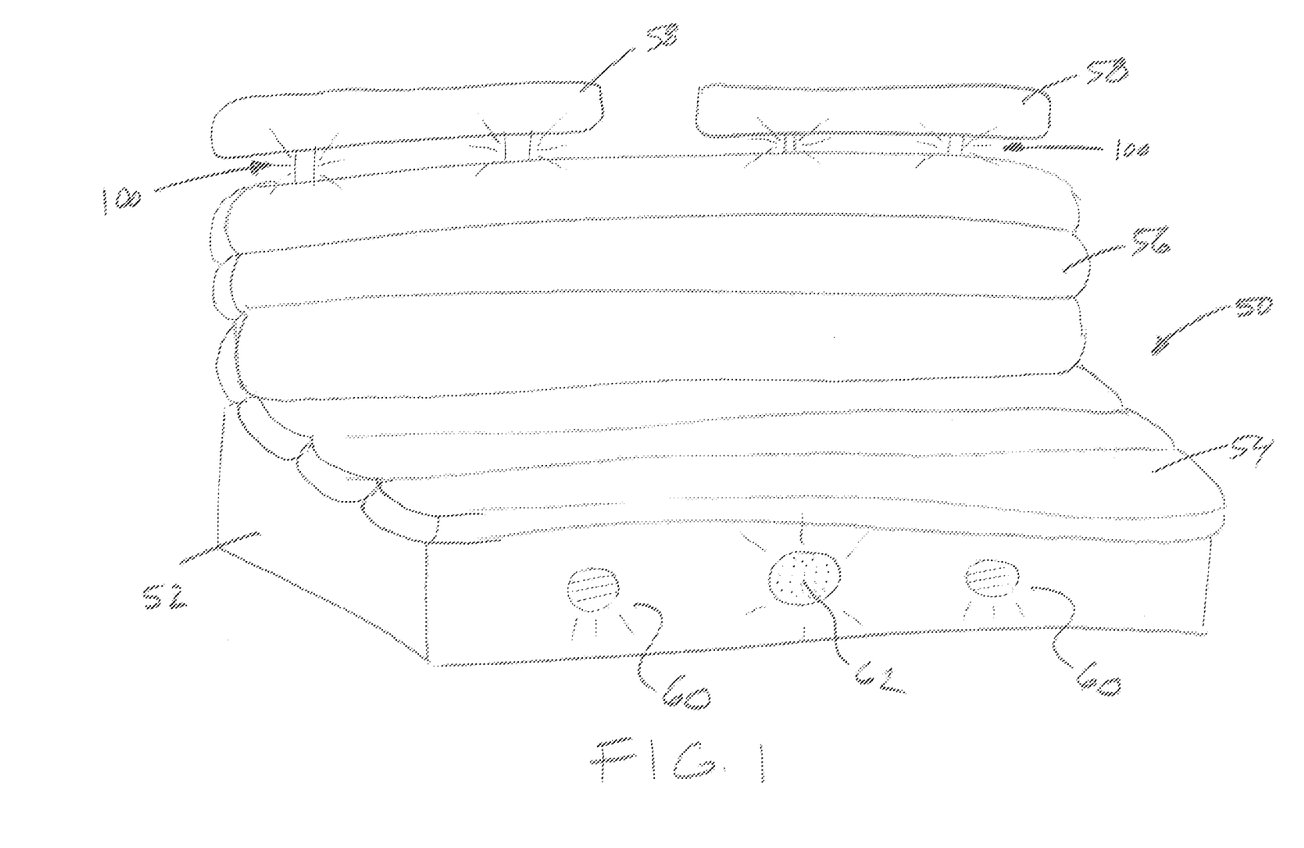
FIG. 1 is a perspective view of a bench-type seat on for a watercraft, according to one or more embodiments.

Referring now to FIG. 1, a bench-type seat 50 on a watercraft is shown. As may be appreciated from the figure, the seat 50 may include a supporting box portion 52, a seat portion 54, a back portion 56 and one or more headrest or shoulder rest portions 58 supported on one or more stanchions 100. The seat 50 may be arranged on the deck of a pontoon, for example, and may provide for several seating positions along the length of the seat 50 and may also provide for lounging, general containment of persons and articles, and illumination, sound, and/or storage of items.

With respect to the supporting box portion 52, a substantially rectangular or other shaped frame, box, or base may be provided for supporting the seat 54. The box 52 may be generally hollow for storage of items and may allow for running and/or seclusion of wiring for lighting, sound systems, and the like. As shown, the box 52 may include one or more lights 60 for providing floor lighting and/or a speaker 62 for providing sound. The wiring for the lighting 60 and/or the speaker 62 may extend within the supporting box portion 52 of the seat 50 to provide power and/or sound signals to the lighting 60 and/or the speaker 62. It is to be appreciated that electrical power or other wiring for providing power, data, or other information to the seat stanchions 100 may also be provided within, on, or around the supporting box portion 52.

With respect to the seat portion 54, a cushioned portion configured for supporting seated persons is shown. The seat portion 54 may provide for one or more seating positions along the length of the bench 50. As mentioned, the seat 54 may provide for storage within the supporting box portion 52 and, as such, the seat portion 54 may be hingedly connected to the supporting box portion 52 such that the seat portion 54 may be pivoted upward allowing access to the inside of the supporting box portion 52 below the seat portion 54.

The back portion 56 of the seat 50 may extend upwardly from the supporting box 52 and the seat portion 54. The back portion 56 may be a relatively stationary portion of the seat 50 allowing for leaning on, resting on, or otherwise relying on by users or persons seated or standing on the watercraft. As such, the back portion 56 may be relative rigid and may be relatively soft and/or padded on its interior facing surface.

The headrest or shoulder rest portions 58 of the seat 50 may be vertically spaced apart from the back portion 56 and may further provide for leaning on, resting on, or otherwise relying on by users or persons seated or standing on the watercraft. As such, the headrest or shoulder rest portion 58 of the seat may be configured to resist loading in several directions, particularly vertical loading and lateral loading. The headrest or shoulder rest portion 58 may be arranged and supported in vertical cantilevered relation to the back portion 56 of the seat by the stanchions 100.

The stanchions 100, as shown, may connect the headrest or shoulder rest portion 58 of the seat 50 to the back portion 56 or seat portion 54 of the seat 50. As such, the stanchions 100 may be responsible for the vertical cantilevered support of the headrest portion 58 relative to the back portion 56. As also shown, the stanchions 100 may be illuminated, lighted, or light-bulb like allowing for additional illumination to be provided to the deck area of the watercraft.

Figure 2:
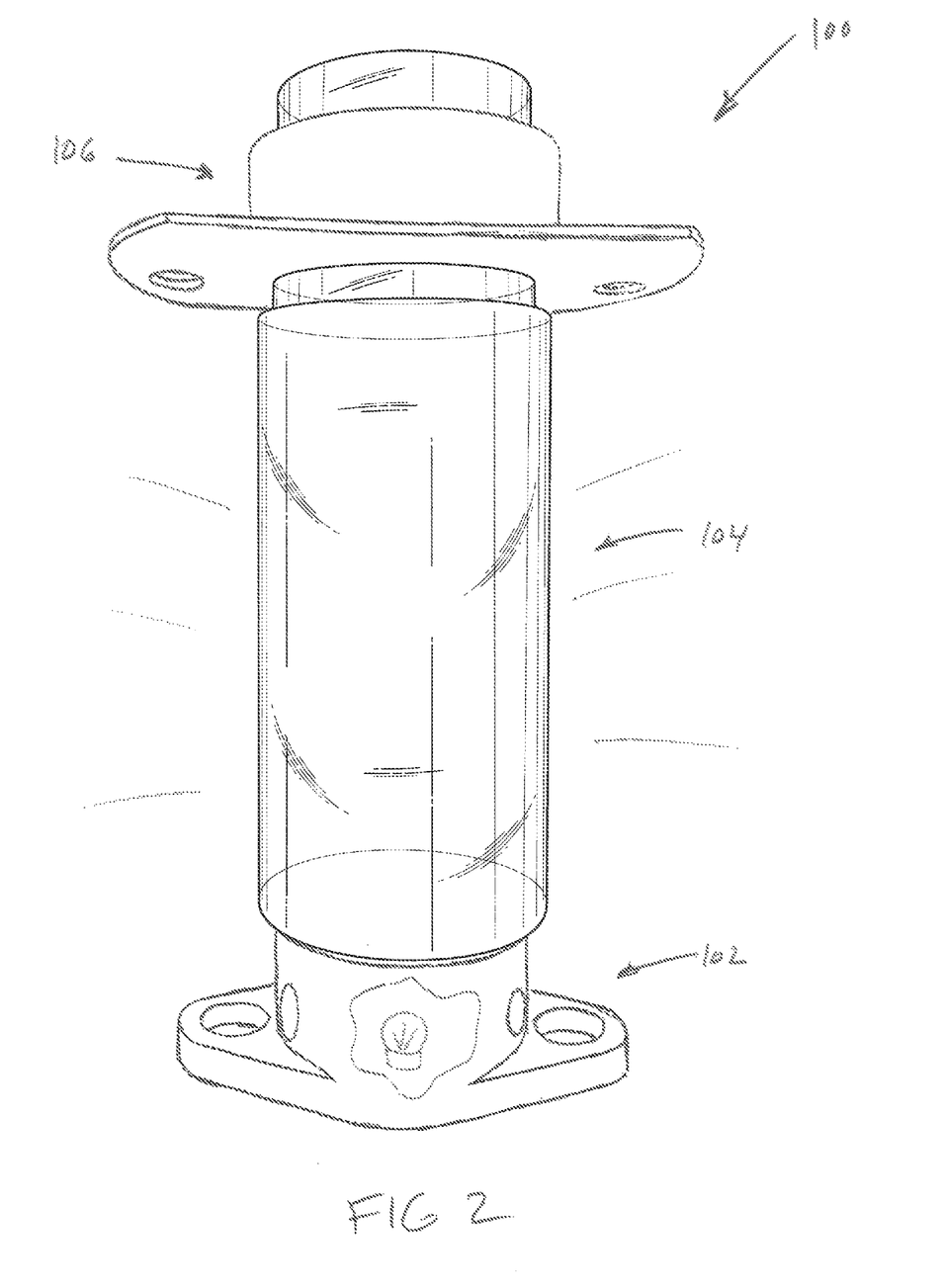
FIG. 2 is a close-up view of a stanchion of the seat of FIG. 1, according to one or more embodiments.

Turning now to FIG. 2, one embodiment of the stanchions 100 of FIG. 1 are shown. As shown, the stanchion 100 may include a base portion 102, a riser portion 104, and a standoff portion 106. The stanchion 100 may be configured for supporting a headrest or shoulder rest portion 58 of a seat 50 relative to another portion of the seat 50. For example, the stanchion 100 may be configured for securing to a core portion or surface of a portion of a seat such as the seatback 56 by anchoring the base portion 102 thereto. In addition, the stanchion 100 may be configured for securing to a core portion or surface of a headrest or shoulder rest portion 58 of the seat 50 by securing a standoff 106 portion thereto. As shown, the stanchion 100 may be configured to illuminate or light up so as to provide lighting to the seating area or surface of a watercraft and/or to provide aesthetic affect.

Figure 3:
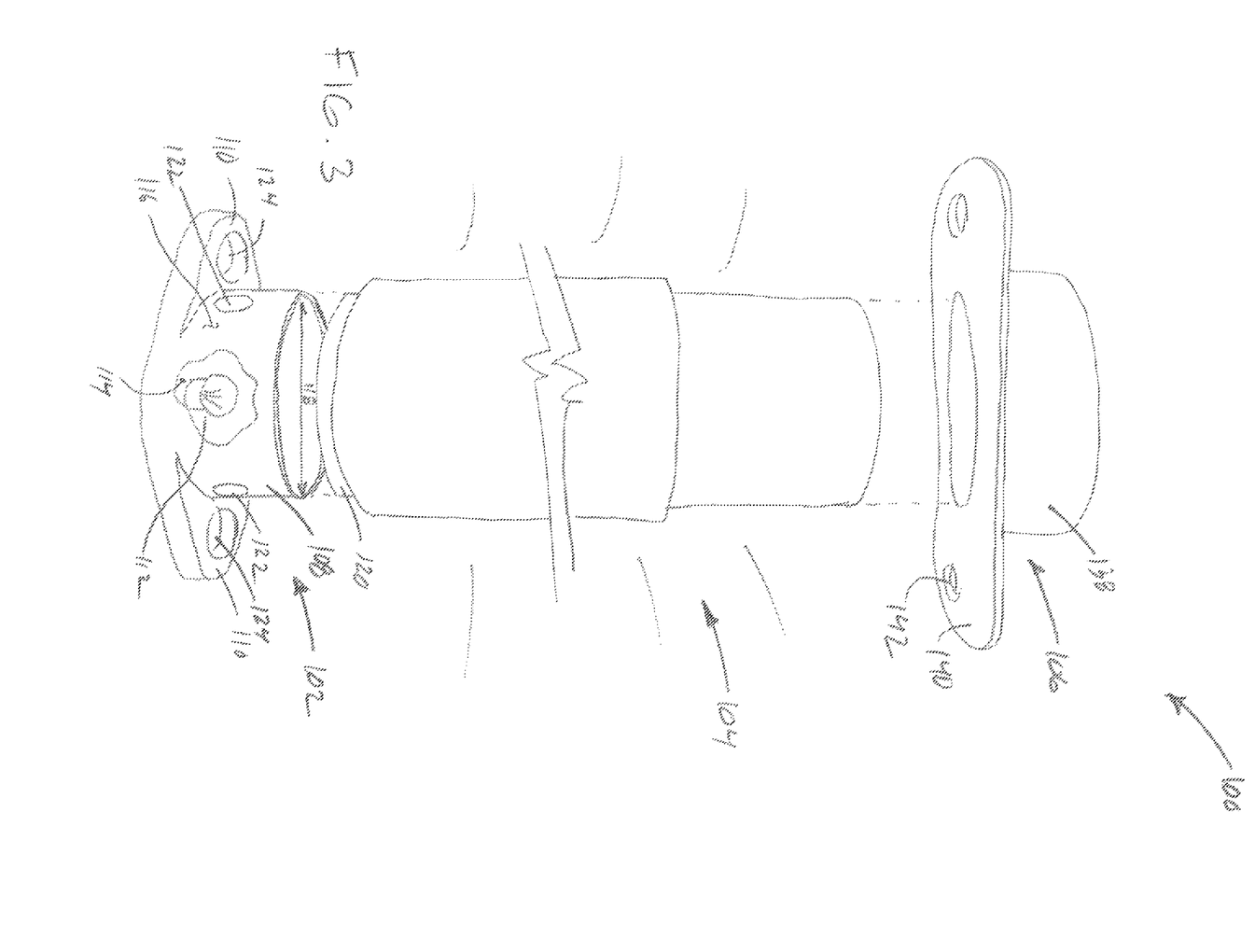
FIG. 3 is an exploded view of the stanchion on FIG. 2, according to one or more embodiments.

Turning now to FIG. 3, an exploded view of the stanchion 100 of FIG. 2 is shown allowing each portion of the stanchion 100 to be shown in more detail. The base portion 62 of the stanchion 100 may include a generally cylindrically shaped housing 108, a pair of laterally extending flanges 110, and a light source 112. The base 102 may be configured for secured attachment to a seatback 56 of a seat 50, for example, and may function to support the stanchion 100 and the headrest or shoulder rest 58 which may be secured at the top of the stanchion 100.

As shown, the generally cylindrical shaped housing 108 may be configured to house a light source 112 for illumination of the stanchion 100 as well as provide anchorage and support for the riser portion 104 of the stanchion 100. The housing 108 may include a bottom 114 and a cylindrical sidewall 116 extending upwardly from the bottom 114 forming a cavity. The cylindrical sidewall 116 may define an inner diameter 118 configured for receiving a stub portion 120 of the riser 104 and a wall thickness. In one or more embodiments, the sidewall may have an internally threaded surface for engaging threads on the stub portion 120 of the riser 104. The sidewall 116 may have a height adapted to receive the stub portion 120 of the riser 104 while simultaneously providing sufficient clearance for a light source 112 such as a light bulb, LED, or other light emission system or device. The bottom 114 of the housing may include one or more openings for securing the light source 112 and or allowing electrical wiring or connections to pass through the base 102. In other embodiments, as shown, the sidewall 116 may include an opening or pair of openings 122 for stringing wiring from one stanchion 100 to the next or for allowing moisture to exit the base 102.

The laterally extending flanges 110 may be configured for securing the base 102 to a mount location. In some embodiments, for example, the stanchion 100 may be secured to a padded seat and the padded seat may have a core portion. The laterally extending flanges 110 of the base 102 may be positioned on the core portion and secured thereto with screws or other fasteners. Once positioned, the padded portion of the seat or other upholstery may be positioned over the base portion 102 or the flange 110 of the base portion 102 to seclude all or part of the base portion.

The laterally extending flanges 110 of the base 102 may be relatively rigid and may extend laterally from the bottom 114 of the housing 108. The flanges 110 may include an aperture 124 for receiving the fastener to secure the base 102. The flanges 110 may be relatively triangularly shaped with a triangle base that is substantially the same as the outside diameter of the cylindrical sidewall portion 116 such that the cylindrical sidewall 116 and the bottom corners of the triangular base from each flange create a flush front and back surface on the base 102 with the housing 108. The housing 108 and the laterally extending flanges 110 may be constructed of substantially strong metal material such as aluminum or steel or substantially rigid plastics may also be used. Still other materials may be provided.

The light source 112 of the base 102 may be selected from a large variety of light sources. For example, the light source 112 may be a light bulb such as white light type light source including incandescent, fluorescent, or other light source. In the case of a substantially white light source, a color membrane or series of color membranes may be provide to allow the light source to provide color and, in the case of a series of membranes, may allow the light source to change color. In some embodiments, light emitting diodes or LEDs may be provided and particular color LEDs may be used to provide color or a series of changing or selectable colors.

Figure 4:
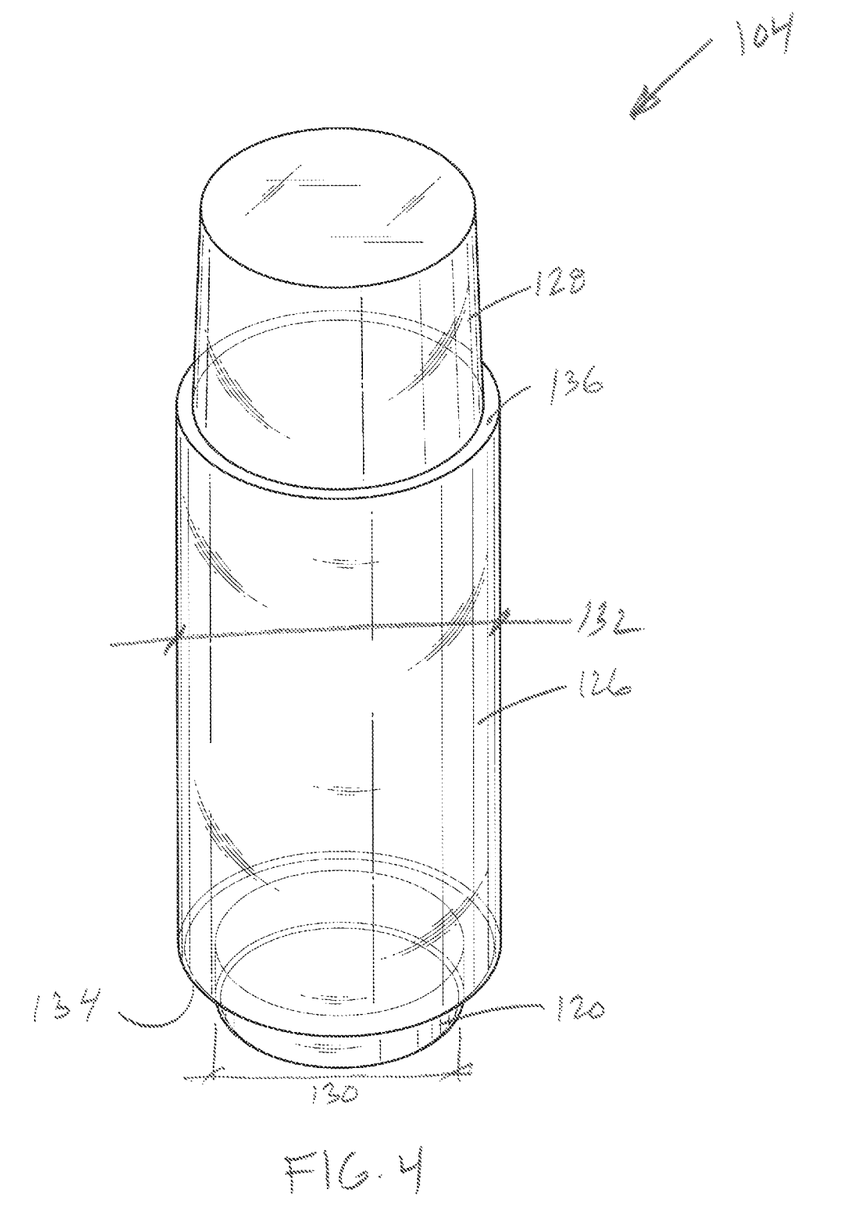
FIG. 4 is a perspective view of a core portion of the stanchion of FIGS. 2 and 3, according to one or more embodiments.

Turning now to FIG. 4, the riser portion 104 of the stanchion 100 is shown. As shown, the riser portion 104 may include a stub portion 120, a main body portion 126, and a top portion 128. The riser portion 104 may be configured to extend from the base 120 of the stanchion 100 upwardly to and through the standoff portion 106 and may be configured to receive and, in turn, emit light from the light source 112 positioned in the base 102. The riser portion 104 may further be configured to provide physical support in both a vertical and lateral direction to the supported headrest, shoulder rest 58, or other supported element near the standoff portion 106 of the stanchion 100.

As shown in FIG. 4, the stub portion 120 may be configured for engaging the base portion 102 of the stanchion 100. As such, the stub portion 120 may be substantially cylindrical in shape to match the shape of the housing portion 108 of the base 102. The stub portion 120 may have a diameter 130 selected for seatingly or threadably engaging the cylindrical wall 116 portion of the base 102. That is, the diameter 130 may be substantially the same as the inside diameter 118 of the cylindrical wall portion 116 of the base 102 and may be adapted for a friction fit or other tight fit or the outside surface of the stub portion 120 may be threaded to engage threads on the inside surface of the wall portion of the base 106. The stub portion 120 may have a height selected to substantially engage the base 102 while accommodating any clearances to provide space for the light source 112. Such clearances may be related to clearances for vibratory motion, to avoid contact, or to allow dissipation of heat from the light source 112, for example.

The stub 120 may be secured to the base portion 102 with an adhesive, such as an epoxy, or other relatively strong adhesive. The stub 120 may be secured to the base 102 in a manner to provide for lateral loads on the riser and also to prevent moisture or water from entering the base 102. In some embodiments, the base 102 and the riser 104 may be molded as a single piece to avoid the need for the joint between the two parts. In still other embodiments, the two elements may be fused together or otherwise connected.

The main body portion 126 of the riser 104 may be substantially cylindrical and may include a diameter 132 slightly larger than the stub portion 120 thereby providing a lip or ledge 134 for engaging the top surface of the cylindrical wall 116 of the base 102 and creating a stop against over insertion of the riser 104 into the base 102. In some embodiments, the lip or ledge 134 may be substantially the same as the thickness of the cylindrical wall 116 creating a flush transition between the base 102 and the riser 104. In other embodiments, the lip or ledge 134 may be slightly larger than the thickness of the cylindrical wall 116 to provide for a better ability to apply the adhesive between the two and to resist passage of moisture into the base 102. The main body 126 of the riser 104 may have a height selected to provide space between the supporting seatback 56 and the headrest or shoulder rest 58. Like the bottom end, the top end of the main body 126 may include a diameter slightly larger than the top portion providing a top lip 136. The top lip 136 may create a stop point for standoff portion 106 of the stanchion 100 by preventing motion of the standoff portion 106 downward beyond the lip 136.

The top portion 128 of the riser portion 104 of the stanchion 100 may extend upwardly from the main body portion 126. The diameter of the top portion 128 where it leaves the main body 126 may be slightly smaller than the diameter of the main body as mentioned. In addition, the diameter of the top portion 128 may gradually decrease as the top portion 128 extends away from the main body 126 thereby creating a tapered top portion 128. The top portion 128 of the riser may extend away from the main body 126 a selected distance and may terminate in a substantially flat plateau or top surface.

It is to be appreciated that the riser portion 104 may be fixedly secured to the base portion 102 and the headrest or shoulder rest portion 58 may have bores created therein for receiving the risers 104. In some embodiments, the standoff portion 106 of the stanchion 100 may be positioned on the headrest or shoulder rest portion 58 before the headrest or shoulder rest portion 58 is installed on the seatback 56. This may aid in the ability to upholster both the seat back 56 and the headrest or shoulder rest 58. Accordingly, in some circumstances the alignment of the standoff portion 106 secured to the headrest or shoulder rest 58 and the corresponding riser 104 secured to the seatback 56 may be slightly off. The tapered top 128 of the riser and the diameter of the standoff portion 106 may provide some play in the connection allowing the headrest and shoulder rest 58 to securely engage the riser without being perfectly aligned. Still further, the tapered top 128 may allow for a friction fit of the headrest or shoulder rest 58 allowing for selected removal of the headrest or shoulder rest by the user.

Figure 5:
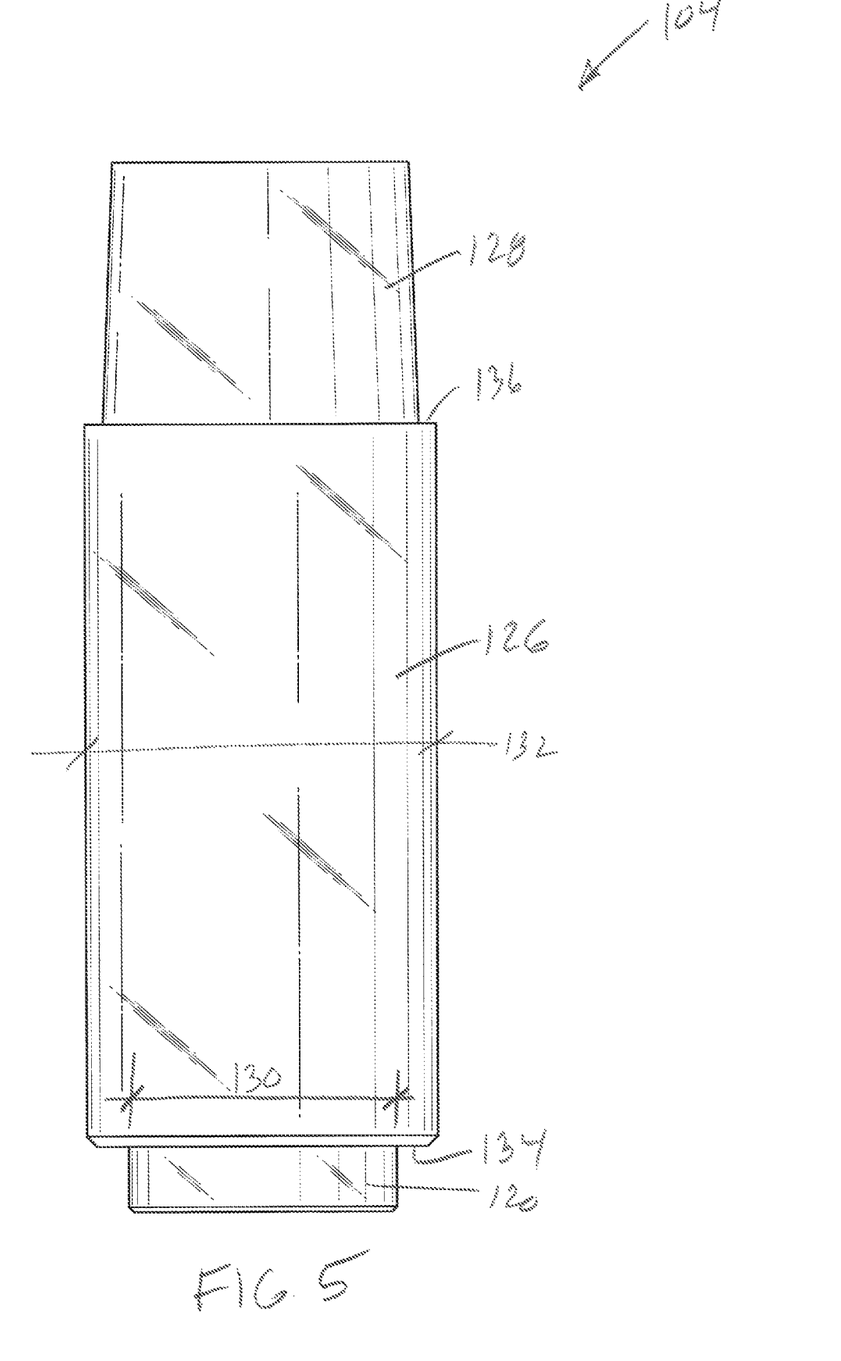
FIG. 5 is a side view of the core portion of FIG. 4, according to one or more embodiments.
Figure 6:
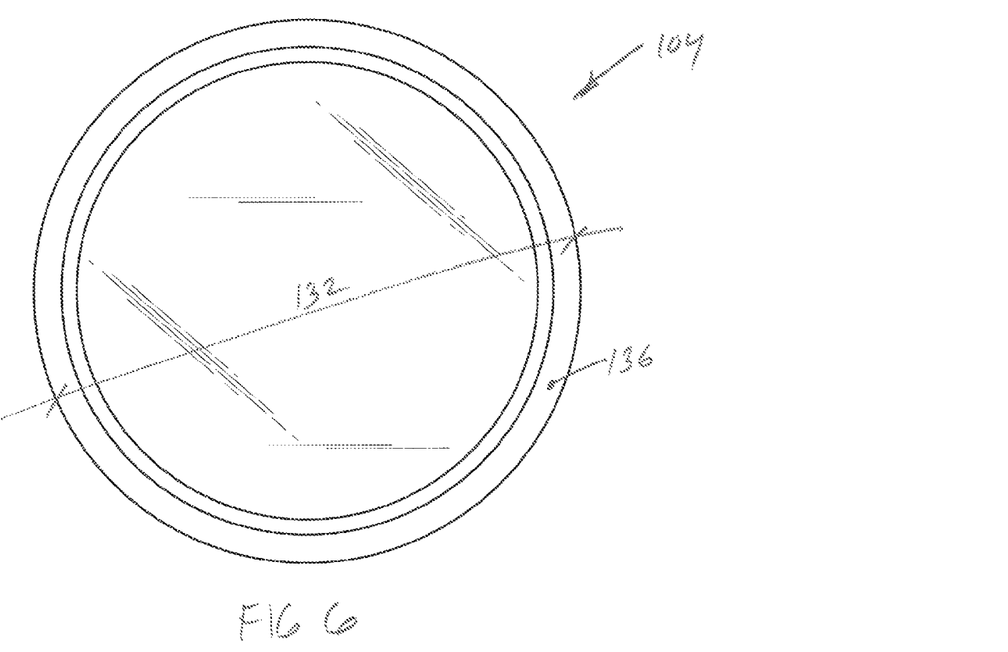
FIG. 6 is a bottom view of the core portion of FIG. 4, according to one or more embodiments.
Figure 7:
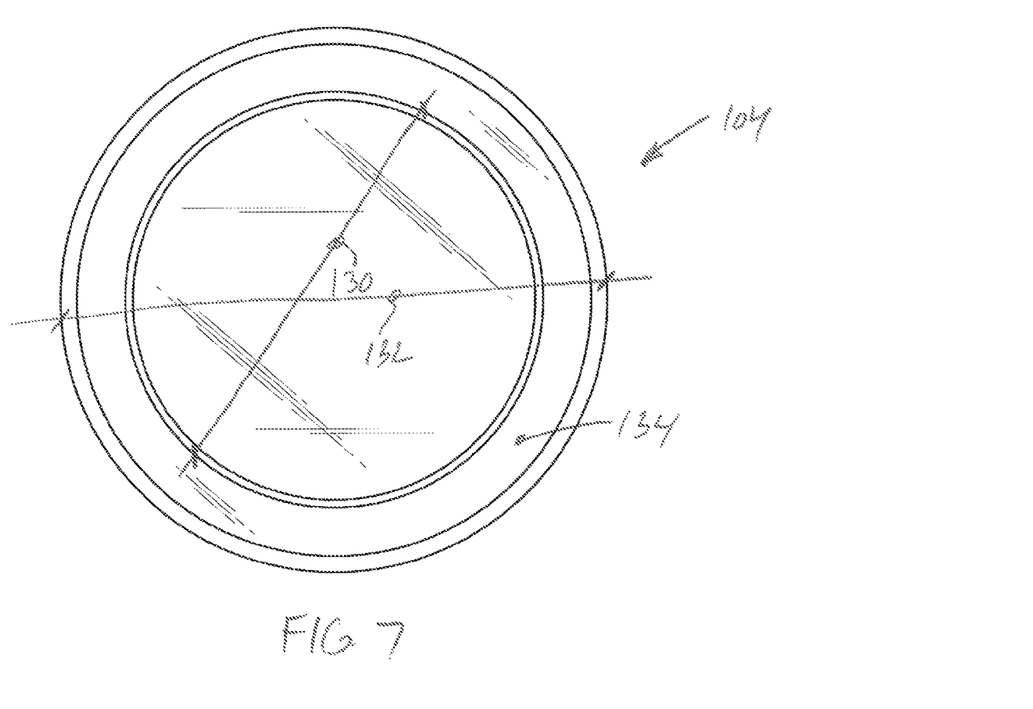
FIG. 7 is a top view of the core portion of FIG. 4, according to one or more embodiments.

FIGS. 5, 6, and 7 show additional views of the riser portion 104 of the stanchion 100. As shown, the bottom edge of the stub portion may include a chamfered edge and the bottom edge of the main body portion may include a chamfered edge. However, the top surface and the top lip may have substantially squared edges. It is to be appreciated that square edges may be provided near the bottom and chamfered edges may be provided near the top and both chamfered or squared edges may be provided at the top and the bottom.

The riser portion 104 including the stub portion 120, the main body portion 126 and the top portion 128 may be constructed of a transparent, semi-transparent, or translucent material such that light shone into the riser 104 may extend through the riser 104 and be emitted therefrom. In some embodiments, the riser portion 104 may include Acrylic (polymethlamethacrylate), Butyrate (cellulose acetate butyrate), Lexan (polycarbonate), and PETG (glycol modified polyethylene terphthalate). In other embodiments, the riser portion 104 may be constructed from glass, tempered glass, or other materials. Still other materials may be provided.

As shown, the material in the riser portion 104 may be substantially solid and homogeneous without inclusions, gaps, or other non-homogenous elements. In other embodiments, inclusions may be provided to, among other things, reflect light. For example, metal flecks, entrained air such as bubbles, or other inclusions may be provided to create different aesthetic looks. Still other options for inclusions and light reflection and/or refraction may be provided.

In some embodiments, the top surface of the riser portion 104 may be mirrored such that light reaching the top of the riser 104 is reflected back into the riser 104 for further opportunity to be emitted from the riser 104. In some embodiments, a polished metal disc may be positioned on the top surface of the riser 104 to provide the mirror. In other embodiments, silver paint or other mirror techniques may be used.

It is to be appreciated that the structure and relationship of the present stanchion 100 allows the stanchion 100 to be illuminated or lighted, but also allows the stanchion 100 to be light bulb like. That is, with the light source 112 positioned below the riser 100, and directed into and through the riser 100, the riser 100 tends to appear as though it is glowing like a light-bulb. This is distinguishable from other methods of illuminating or lighting that may involve shining light onto a surface and having it appear illuminated or lit due to the reflectance of light off of its surface. Accordingly, while the present stanchion 100 may be referred to as an illuminated stanchion or a lighted stanchion, an additional way to describe the stanchion is to suggest that it is light bulb like. Moreover, the present stanchion 100 serves a structural purpose in supporting the headrest or shoulder rest portion 58 of the seat 50 providing for a unique combination of form and function.

Returning now to FIG. 3, the standoff portion 106 of the stanchion 100 is shown. The standoff portion 106 may be configured for seating on the top portion 128 of the riser 104 and for supporting the headrest or shoulder rest 58 relative thereto. As shown, the standoff portion 106 may include a collar portion 138 and a flange portion 140. The collar portion 138 may be substantially cylindrically shaped having a top opening and a bottom opening formed by a bore extending therethrough. The collar portion 138 may have a cylindrical or tapered cylindrical sidewall portion defining an inside diameter adapted to engage the top portion 128 of the riser 104. That is, the inside diameter of the sidewall portion of the collar 138 may be selected to fall between the smallest diameter of the tapered top portion 128 of the riser 104 and the largest diameter of the tapered top portion 128 of the riser 104. As such, when the standoff portion 106 is placed on the top portion 128 of the riser 104 a friction fit may be established by forcing the standoff portion 106 into engagement with the top portion 128 of the riser 104.

The flange portion 140 of the standoff 106 may include a substantially planar element extending across the bottom of the standoff 106 creating a shelf or substantially horizontal supporting surface. The flange portion 140 may have a length longer than the outside diameter of the collar portion 138 and width that is also larger than the collar portion 138. As such, elements such as core portions of headrests or shoulder rest portions may have a bore in them for receiving the top portion 128 of the riser 104 and for receiving the collar 138, but the bore may be sized smaller than the flange portion 140 such that portions of the core rest on the flange 140. The flange 140 may also include one or a plurality of securing holes 142 for receiving fasteners to secure the core portion to the standoff 106. The collar 138 and flange portions 140 of the standoff 106 may be constructed of relatively rigid materials such as steel or aluminum or substantially rigid plastics may also be used.

Figure 8:
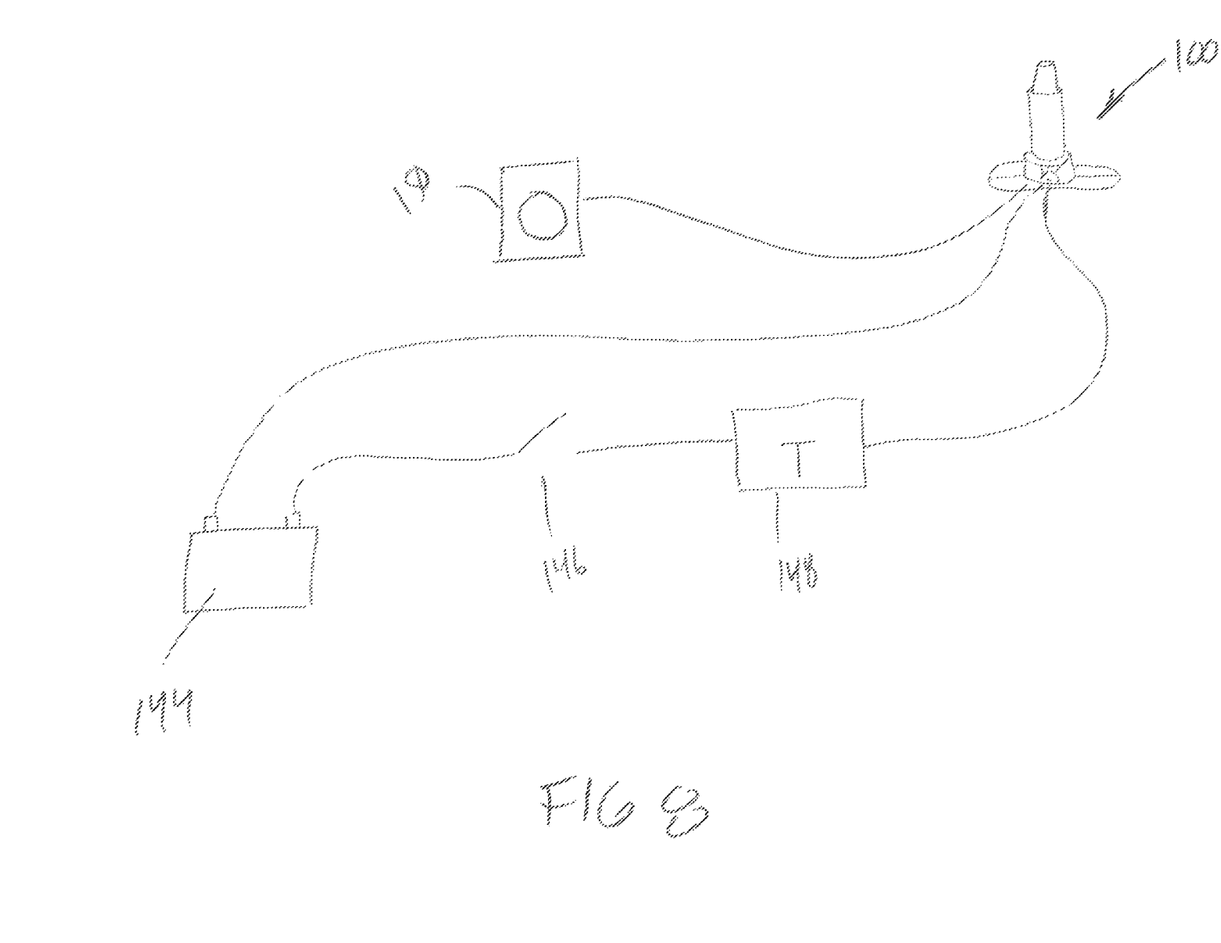
FIG. 8 is an electrical schematic of the power system of the stanchion shown in FIGS. 1, 2, and 3, according to one or more embodiments.

Referring now to FIG. 8, an electrical schematic is shown. As shown, the illuminated stanchion 100 may receive power from a battery or other power source 144. Current may be provided to the stanchion 100 via a switch 146 allowing the user to control when the stanchion 100 is turned on and off. In some embodiments, the switch 146 may be positioned at or near the main console of the watercraft or other vehicle. In some embodiments, the stanchions 100 may have a dedicated circuit allowing the stanchions 100 to be turned on/off alone or the stanchions 100 may be on a circuit with other lighting systems. In some embodiments, depending on the nature of the power source, the nature of the light source, and other factors, a transformer 148 may be provided to control the electricity being sent to the stanchion 100. As may be appreciated, while one stanchion is shown, any given watercraft may include one or a plurality of illuminated stanchions 100. In still other embodiments, a color control 150 may be provide allowing the user to control the color emitted from the stanchions 100. For example, the control may allow for controlling one or more LED light sources such that blends of colors may be used to create selected colors. In some embodiments, the control may be a sort of color wheel allowing LEDs of red, blue and yellow to be used to create a selected color of the color spectrum. Still other types of light sources 112 and other types of controllers 150 may be used to provide the ability of a user to select the emitted color.

It should be appreciated that the above description described the present stanchion based on a generally cylindrical or round riser portion and, as such, the base portion and standoff portion also included cylindrical or round components. Any number of cross-sectional geometries may be used and remain with the scope and spirit of the present invention. For example, a square, oval, triangular, rectangular, thin-plate, or other cross-sectional shapes may be used for the riser with correspondingly shaped bases and standoff portions.

It should also be appreciated that the present stanchion was described as a stationary, non-adjustable stanchion. However, nothing in the present application should be construed as preventing or otherwise disclaiming adjustable stanchions. For example, with reference to FIG. 3, in some embodiments, the standoff portion may be sized to allow for it to travel along the length of the riser portion and the headrest or shoulder rest portion may include a sleeve extending upward into it from the bottom and allowing the riser to extend into the headrest or shoulder rest. In these embodiments, the standoff portion may include a clamp, jaw, or other mechanism for securing its position along the length of the riser allowing for the height of the headrest to be selected. In still other embodiments, the base portion may be in multiple pieces including a housing portion and a separate flange portion where the housing portion and the riser are secured to one another and allowed to travel downward into a sleeve in the seat back. The flange portion may include a jaw, clamp, or other mechanism for securing the position of the riser as it passes into the seatback allowing the height of the headrest to be selected.

In some embodiments, movement of the headrest between a fully down position and a somewhat or fully up position may cause the illuminated stanchion to turn on and off. For example, when the headrest is fully down such that no portion of the stanchion is exposed, a contact or other electrical type switch may be made or interrupted causing the light source to be deactivated. However, when the headrest or shoulder rest is lifted, the contact may be interrupted or made such that the light source is activated.

It should also be appreciated that while the light source has been shown to be positioned in the base, the light source may also be positioned near the top of the riser such that light may be shone downward from the top rather than upward from the bottom. In some embodiments, the riser may include a bore or channel extending therethrough to allow wiring or other electronics to extend upward through the center of the riser. Such channel or bore may include a mirrored or opaque inner surface so as to seclude any such wiring and/or add to the reflectiveness of the riser. In other embodiments, electronics or wiring may be delivered to the top side of the riser using a different route.

It is also to be appreciated that while the focus of the application was on watercraft, seats, seating positions, headrests, and associated stanchions are present in a multitude of other environments, particularly motor vehicles such as cars, trucks, buses, and trains. Nothing should be construed in the present application as restricting the use of the illuminated stanchion in these and other contexts.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A headrest associated with a seating position on a vehicle, the seating position having a seat portion and a back portion, the headrest comprising:
   a rest portion configured for laterally and/or vertically supporting the head or torso of a user seated in the seating position; and
   a support portion comprising a riser comprising a translucent material and configured for spaced apart and lateral support of the rest portion relative to the back portion of the seating position, the support portion comprising a light source arranged to illuminate the support portion by directing light through the translucent material.

2. The headrest of claim 1, wherein the support portion further comprises a base portion and a standoff portion.

3. The headrest of claim 2, wherein the base portion and the standoff portion are arranged along the length of the riser and define a space between the back portion and the main body portion.

4. The headrest of claim 2, wherein the riser comprises a stub portion configured to engage the base portion and a top portion configured for engagement by the standoff portion.

5. The headrest of claim 1, wherein the support portion further comprises a base portion having a housing for receiving the riser.

6. The headrest of claim 5, wherein the light source is arranged within the housing and below the riser.

7. The headrest of claim 6, wherein the light source is directed upwardly into the riser causing light to be emitted from the riser in light bulb like fashion.

8. The headrest of claim 7, wherein the light source is an incandescent bulb.

9. The headrest of claim 7, wherein the light source is a light emitting diode.

10. The headrest of claim 6, wherein the riser comprises a reflecting surface on an end opposite the light source.

11. The headrest of claim 1, wherein the riser comprises an acrylic material.

12. The headrest of claim 11, wherein the riser is substantially homogeneous.

13. The headrest of claim 11, wherein the riser comprises one or more inclusions.

14. The headrest of claim 13, wherein the riser comprises metallic flecks.

15. The headrest of claim 13, wherein the riser comprises entrained air.

16. A watercraft, comprising:
    a boat; and
    a headrest associated with a seating position on the boat, the seating position having a seat portion and a back portion, the headrest comprising:
      a rest portion configured for laterally and/or vertically supporting the head or torso of a user seated in the seating position; and
      a support portion comprising a riser comprising a translucent material and configured for spaced apart and lateral support of the rest portion relative to the back portion of the seating position, the support portion comprising a light source arranged to illuminate the support portion by directing light through the translucent material.

17. The watercraft of claim 16, wherein the boat is a pontoon boat.

18. The watercraft of claim 16, wherein the boat is a deck boat.

19. The watercraft of claim 16, wherein the watercraft comprises a main console and the main console comprises a switch for activating and/or deactivating the light source.

20. The watercraft of claim 16, further comprising a color control configured to control the color emitted by the light source.

* * * * *